United States Patent [19]
Kito et al.

[11] Patent Number: 4,798,242
[45] Date of Patent: Jan. 17, 1989

[54] HEAT EXCHANGER FOR RECOVERING HEAT FROM EXHAUST GASES

[75] Inventors: Masahiro Kito, Nagoya, Japan; Katsuhiro Mori, Hove, England; Takashi Mitsumoto, Kassel, Fed. Rep. of Germany

[73] Assignee: Aisin Seiki Kabushiki Kaisha Co., Ltd., Kariya, Japan

[21] Appl. No.: 868,530

[22] Filed: May 30, 1986

[30] Foreign Application Priority Data

May 30, 1985 [GB] United Kingdom ............... 8513635

[51] Int. Cl.$^4$ .................. F27D 17/00; F28F 19/00; F28F 13/00
[52] U.S. Cl. .................... 165/103; 165/101; 165/71; 165/921; 165/143; 165/134.1
[58] Field of Search ............... 165/103, 102, 96, 143, 165/145, 71, 100, 101, 134.1, 921

[56] References Cited

U.S. PATENT DOCUMENTS

| | | | |
|---|---|---|---|
| 1,640,746 | 8/1927 | Braun | 165/143 |
| 3,231,013 | 1/1966 | Heller et al. | 165/111 |
| 3,390,719 | 7/1968 | McCallister | 165/103 |
| 4,646,818 | 3/1987 | Ervin, Jr. | 165/103 |

FOREIGN PATENT DOCUMENTS 1558313 12/1979 United Kingdom .

Primary Examiner—Albert W. Davis, Jr.
Attorney, Agent, or Firm—Oblon, Fisher, Spivak, McClelland & Maier

[57] ABSTRACT

A heat exchanger for recovering heat from exhaust gases which includes a plurality of separately divided portions, a fluid passage mechanism for a fluid disposed within each of the portions, a bypass mechanism for the fluid for bypassing each of the portions and a valve mechanism for selectively operating the fluid passage mechanism or the bypass mechanism. The plurality of portions may constitute at least two chambers separately provided in the heat exchanger or at least two parts independently provided ion the heat exchanger. In addition, discharge means for discharging the fluid in the plurality of portions is provided.

4 Claims, 1 Drawing Sheet

HEAT EXCHANGER FOR RECOVERING HEAT FROM EXHAUST GASES

BACKGROUND OF THE INVENTION

1. Field of the Invention

The present invention relates to a heat exchanger, and more particularly to a heat exchanger which can maintain within a certain range the temperature at an outlet port of a fluid.

2. Description of the Prior Art

In a conventional heat exchanger which includes a bypass passage, a temperature sensor provided at an outlet portion of the heat exchanger, signal transmitting means for transmitting a signal, and a changing valve provided at an inlet port of the heat exchanger for controlling the exhaust gas at the inlet port according to the signal from the signal transmitting means, the temperature at the inlet port of the heat exchanger is decreased and subsequently the temperature at the outlet port of the heat exchanger is also decreased. When the temperature at the outlet port approaches the condensing temperature, the changing valve is activated. Therefore, the exhaust gas at the inlet port of the heat exchanger is directly supplied to the outlet port of the heat exchanger through the bypass passage without heat recovery. Consequently the temperature at the outlet port of the heat exchanger is increased to a value much greater than the condensing temperature, so that effective use of the exhaust gas is not expected.

SUMMARY OF THE INVENTION

An object of the present invention is to provide an improved heat exchanger which obviates the aforementioned drawbacks of the described conventional heat exchanger.

A further object of the present invention is to provide an improved heat exchanger which can maintain a certain range of temperature of one fluid at an outlet port in spite of the change of conditions of the temperature of the fluid at an inlet port, and the temperature and the flow rate of the other fluid.

A still further object of the present invention is to provide an improved heat exchanger which is relatively small and compact in size.

To achieve the objects and in accordance with the purpose of the invention, a heat exchanger according to the present invention comprises a plurality of portions separately provided, a fluid passage for one fluid disposed within each portion, a bypass passage for the fluid for bypassing each portion and valve means for suitably selecting either the fluid passage or the bypass passage in each portion. Therefore, such can be suitably selected in accordance with the change of temperature at an outlet port of the other fluid, whether said one fluid is supplied to each portion or the bypass passage by valve means. As a result, the temperature at the outlet port of said other fluid is maintained within a certain range of temperatures.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
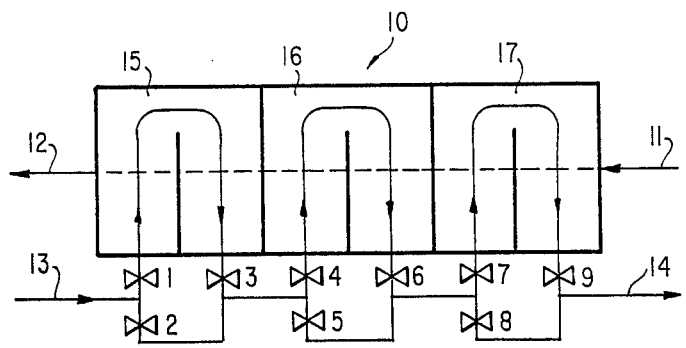
FIG. 1 is a schematic view which shows a first embodiment of a heat exchanger according to the present invention.

Referring now to FIG. 1 which shows a heat exchanger 10 according to the present invention, the exhaust gas flows from an inlet port 11 to an outlet port 12 and the water flows from an inlet port 13 to an outlet port 14. The heat exchanger 10 is divided into three chambers, i.e., first chamber 15, second chamber 16, and third chamber 17. Reference numeral 18 indicates a bypass passage of the water. Reference numerals 1 to 9 indicate a plurality of valves. The valves 1, 3 are provided at inlet and outlet ports of the water in the first chamber 15, the valves 4, 6 are provided at inlet and outlet ports of the water in the second chamber 16, and the valves 7, 9 are provided at inlet and outlet ports of the water in the third chamber 17, respectively. The valve 2 is disposed in the bypass passage 18 between the valves 1, 3, the valve 5 is disposed in the bypass passage 18 between the valves 4, 6, and the valve 8 is disposed in the bypass passage 18 between the valves 7, 9. The valves 2, 5, 8 are correspondingly actuated with the valves 1, 4, 7, respectively. Accordingly, it is selected, whether the water flows to chambers 15, 16, 17 or to the bypass passage 18.

The operation according to the present invention is as follows wherein the following four modes can be attained by the combination of open and close state of the valves 1 to 9.

MODE TABLE 1

| Mode | Chamber in which water flows | Number of valves | | | | | | | | |
|---|---|---|---|---|---|---|---|---|---|---|
| | | 1 | 2 | 3 | 4 | 5 | 6 | 7 | 8 | 9 |
| 1 | 1, 2, 3 chambers | O | C | O | O | C | O | O | C | O |
| 2 | 2, 3 chambers | C | O | C | O | C | O | O | C | O |
| 3 | 3 chamber | C | O | C | C | O | C | O | C | O |
| 4 | None | C | O | C | C | O | C | O | C |

O = open
C = close

When the temperature of the exhaust gas at the inlet port 11 is, for example, increased in the state of mode 2, the temperature at the outlet port 12 is also increased. At this time, when the temperature at the outlet port 12 approaches the upper limit of the temperature range which should be maintained, the combination of the open and close states of the valves is changed and such becomes mode 1. Accordingly, the number of chambers in which the water flows is increased from the second and third chambers 16, 17 to the first, second and third chambers 15, 16, 17 as viewed from the above-mentioned mode table 1. This means the heat transfer area is increased and subsequently the heat exchanger effectiveness is increased. Consequently, he temperature at the outlet port 12 is further decreased to a value more than that at the state of the mode 2 and does not exceed the upper limit of the temperature range which should be maintained.

Next, when the temperature of the exhaust gas at the inlet port 11 is decreased at the state of the mode 2, the temperature at the outlet port 12 is also decreased. At this time, when the temperature at the outlet port 12 approaches the lower limit of the temperature range (normally condensing temperature) which should be maintained, the combination of the open and closed states of the valves is changed and such becomes mode 3. Accordingly, the number of chambers in which the water flows is decreased from the second and third chambers 16, 17 to the third chamber 17. This means that the heat transfer area is decreased and then the heat exchanger effectiveness is decreased. Consequently, the temperature at the outlet port 12 is further increased to a value more than that at the state of mode 2 and is not lowered below the lower limit of the temperature range which should be maintained.

As above-mentioned examples, one of four modes is suitably selected by changing the combination of the open and close states of the valves. Therefore, the temperature at the outlet port 12 is maintained within the certain range which has been previously determined.

Of course, the above-mentioned operations are also executed according to the change of the flow rate of the exhaust gas or the change of the temperature or the flow rate of the water which flows between the inlet and outlet ports 13, 14 so that the temperature at the outlet port 12 can be maintained within the certain range of temperature which is initially intended.

Figure 2:
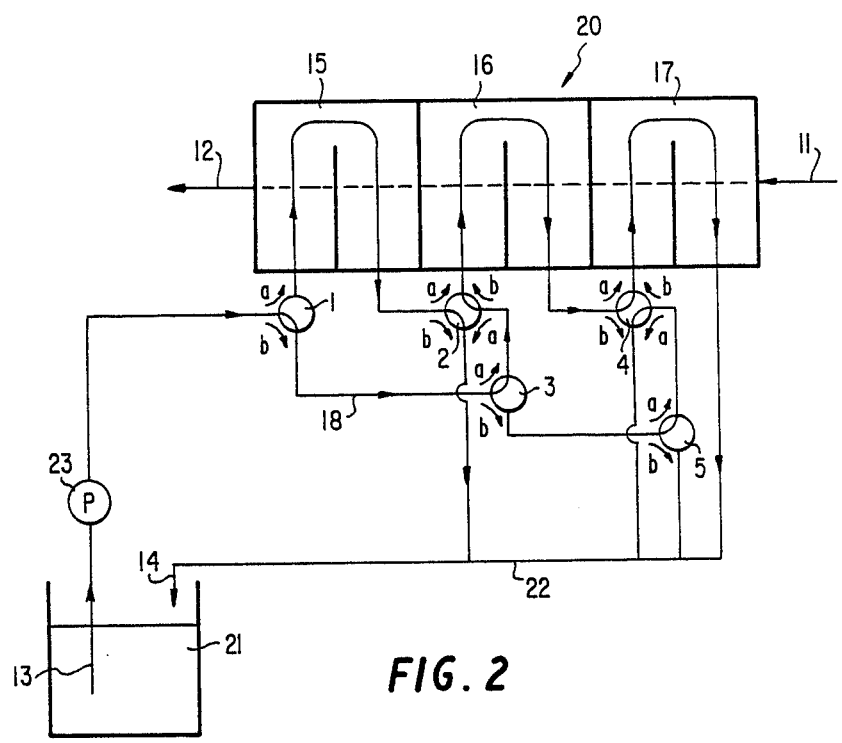
FIG. 2 is a view similar to FIG. 1 which, however, shows a second embodiment of a heat exchanger of the present invention.

Next considering the embodiment of FIG. 2 which shows a second embodiment according to the present invention, a heat exchanger 20 includes a plurality of valves 1, 2, 3, 4, 5 which can change the flowing direction of the water, so that the number of the valves in this embodiment is eliminated in comparison with the first embodiment. The valves 1, 3, 5 each comprise three-way valves and the valves 2, 4 each comprise four-way valves. When the water does not flow into a chamber, for example, the first chamber in FIG. 2, the water within the chamber 15 can be discharged to a tank 21 via a discharge passage 22 by the pressure in the chamber 15. Consequently, the heat exchanger 10 is safe even if the water in the chamber 15 is boiled. The bypass passage 18 passes from the valve 1 to the discharge passage 22 through the valves 3, 5. Reference numeral 23 denotes a pump.

The operation according to the second embodiment is similar in nature to that of FIG. 1, and the combination of the valves 1 to 5 is as follows (wherein FIG. 2 indicates the direction of a, b):

MODE TABLE 2

| Mode | Chamber in which water flows | Number of valves | | | | |
|---|---|---|---|---|---|---|
| | | 1 | 2 | 3 | 4 | 5 |
| 1 | 1, 2, 3 chambers | a | a | — | a | — |
| 2 | 2, 3 chambers | b | b | a | a | — |
| 3 | 3 chamber | b | b | b | b | a |
| 4 | None | b | b | b | b | b |

The state of FIG. 2 shows mode 2. For example, when the mode 2 is changed to the mode 3, the water in the second chamber 16 can flow through the valve 4 to the tank 21 via the discharge passage 22.

The dimensions of each chamber 15, 16, 17 are the same and the mode is determined merely by the number of the chambers in which the water flows in FIGS. 1, 2. In the case where the dimensions of each chamber 15, 16, 17 are different or the heat transfer characteristic of each chamber 15, 16, 17 is changed by fins, etc., the mode is also decided by which particular chamber the water is supplied into, in addition to the number of chambers in which the water flows. This means that when the water is, for example, supplied in only one chamber, there is a difference in the heat exchanger effectiveness accordingly as the water is supplied to the first chamber 15 or the second chamber 16, so that the mode is different in these situations.

Accordingly, when the number of modes is increased as described above, the range in which the temperature at the outlet port can be maintained becomes narrow or the function can be performed in spite of the greater change of conditions at the inlet side and then the effect of the present invention becomes much greater.

By the foregoing, there has been disclosed a preferred form of a heat exchanger constructed in accordance with the present invention. It will be appreciated that various additions, substitutions, modifications and omissions may be made thereto without departing from the spirit of the invention.

What is claimed as new and desired to be secured by Letters Patent of the United States is:

1. A heat exchanger for recovering heat form exhaust gases, comprising:
 a plurality of separately divided chambers for the exhaust gases;
 a plurality of independently fluid passage means disposed within said chambers for the heat recovery fluid;
 means for interconnecting and controlling said plurality of independent fluid passage means and which includes bypass means for bypassing each of said chambers and a plurality of valve means selectively operating said plurality of independent fluid passage means and said bypass means; and
 discharge means for independently discharging fluid from one or more of said plurality of chambers wherein at least one of said valve means is connected to each of said independent fluid passage means, said bypass means and said discharge means.

2. A heat exchanger as set forth in claim 1, wherein said plurality of chambers comprises at least two chambers separately positioned in said heat exchanger.

3. A heat exchanger as set forth in claim 1, wherein said plurality of chambers comprises at least two chambers independently positioned within said heat exchanger.

4. A heat exchanger as set forth in claim 1, wherein said discharge means comprises a discharge passage communicating with said plurality of chambers and a tank.

* * * * *

UNITED STATES PATENT AND TRADEMARK OFFICE
CERTIFICATE OF CORRECTION

PATENT NO. : 4,798,242
DATED : JANUARY 17, 1989
INVENTOR(S) : MASAHIRO KITO ET AL

It is certified that error appears in the above-identified patent and that said Letters Patent is hereby corrected as shown below:

In the Abstract, line 10, change "ion" to --in--.

In column 2, line 59, change "he" to --the--.

In column 3, line 13, after "As" insert --in the--.

In column 4, line 29, change "form" to --from--.

Signed and Sealed this

Fifth Day of September, 1989

Attest:

DONALD J. QUIGG

Attesting Officer

Commissioner of Patents and Trademarks